United States Patent
Park et al.

(10) Patent No.: US 9,472,340 B2
(45) Date of Patent: Oct. 18, 2016

(54) COIL TYPE UNIT FOR WIRELESS POWER TRANSMISSION, WIRELESS POWER TRANSMISSION DEVICE, ELECTRONIC DEVICE AND MANUFACTURING METHOD OF COIL TYPE UNIT FOR WIRELESS POWER TRANSMISSION

(71) Applicant: SAMSUNG ELECTRO-MECHANICS CO., LTD., Suwon-Si, Gyeonggi-Do (KR)

(72) Inventors: No Il Park, Suwon-Si (KR); Seung Wook Park, Suwon-Si (KR); Chang Bae Lee, Suwon-Si (KR); Chang Ryul Jung, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 43 days.

(21) Appl. No.: 14/332,082

(22) Filed: Jul. 15, 2014

(65) Prior Publication Data
US 2015/0061400 A1    Mar. 5, 2015

(30) Foreign Application Priority Data
Aug. 29, 2013   (KR) .................. 10-2013-0103298

(51) Int. Cl.
| | |
|---|---|
| H01F 5/00 | (2006.01) |
| H01F 38/14 | (2006.01) |
| H01F 27/28 | (2006.01) |
| H01F 41/04 | (2006.01) |
| H04B 5/00 | (2006.01) |
| H02J 7/02 | (2016.01) |

(52) U.S. Cl.
CPC ................ *H01F 38/14* (2013.01); *H01F 5/00* (2013.01); *H01F 27/2804* (2013.01); *H01F 41/041* (2013.01); *H04B 5/0037* (2013.01); *H04B 5/0075* (2013.01); *H02J 7/025* (2013.01); *Y10T 29/4902* (2015.01)

(58) Field of Classification Search
CPC ....................... H01F 5/00; H01F 27/00–27/30
USPC ................ 336/65, 83, 84 R, 84 M, 200, 232
See application file for complete search history.

(56) References Cited

U.S. PATENT DOCUMENTS

| | | | |
|---|---|---|---|
| 9,165,708 B2* | 10/2015 | Lim ......................... | H02J 5/005 |
| 2008/0309287 A1* | 12/2008 | Reed ....................... | H01F 38/14 |
| | | | 320/108 |
| 2009/0284341 A1* | 11/2009 | Okada ................... | H04B 1/3883 |
| | | | 336/232 |

(Continued)

FOREIGN PATENT DOCUMENTS

KR   10-2012-0008200 A   1/2012

*Primary Examiner* — Tuyen Nguyen
(74) *Attorney, Agent, or Firm* — NSIP Law

(57) ABSTRACT

The present invention relates to a coil type unit for wireless power transmission, a wireless power transmission device, an electronic device, and a manufacturing method of a coil type unit for wireless power transmission. A coil type unit for wireless power transmission of the present invention includes a coil portion having a coil pattern on a substrate; a magnetic portion having the coil portion attached to one surface thereof and a conductive pattern formed thereon; an adhesive portion interposed between the magnetic portion and the coil portion to mutually bond the magnetic portion and the coil portion; and a conductive hole for electrically connecting the coil pattern and the conductive pattern, wherein the adhesive portion is formed on one surface of the magnetic portion having the conductive pattern thereon while being formed in an area other than the area in which the conductive pattern is formed.

9 Claims, 7 Drawing Sheets

(56) References Cited

U.S. PATENT DOCUMENTS

2010/0320843 A1* 12/2010 Kitamura ................ H01F 27/34
307/104
2011/0181118 A1* 7/2011 Chen ....................... H02J 5/005
307/104
2013/0300360 A1* 11/2013 Kobayashi .............. H01F 38/14
320/108
2014/0239892 A1* 8/2014 Sawa ....................... H01F 38/14
320/108
2015/0001951 A1* 1/2015 Park ........................ H01F 38/14
307/104

* cited by examiner

COIL TYPE UNIT FOR WIRELESS POWER TRANSMISSION, WIRELESS POWER TRANSMISSION DEVICE, ELECTRONIC DEVICE AND MANUFACTURING METHOD OF COIL TYPE UNIT FOR WIRELESS POWER TRANSMISSION

CROSS-REFERENCE TO RELATED APPLICATIONS

Claim and incorporate by reference domestic priority application and foreign priority application as follows:

CROSS REFERENCE TO RELATED APPLICATION

This application claims the benefit under 35 U.S.C. Section 119 of Korean Patent Application Serial No. 10-2013-0103298, entitled filed Aug. 29, 2013, which is hereby incorporated by reference in its entirety into this application.

BACKGROUND OF THE INVENTION

1. Field of the Invention

The present invention relates to a coil type unit for wireless power transmission, a wireless power transmission device, an electronic device, and a manufacturing method of a coil type unit for wireless power transmission.

2. Description of the Related Art

In recent times, a wireless power transmission system has been studied to charge a secondary battery embedded in a mobile terminal etc.

In general, the wireless power transmission device includes a wireless power transmission device that transmits power and a wireless power reception device that receives and stores power.

The wireless power transmission device transmits and receives power using magnetic resonance and electromagnetic induction. For this, in recent times, studies and development have been continuously conducted to improve a wireless power transmission distance.

Therefore, there are active studies on reduction of power transmission time as well as maximization of wireless power transmission efficiency between the wireless power transmission device (wireless charger etc.) and the wireless power reception device (mobile terminal etc.). Among them, studies and development of a coil type unit for wireless power transmission in which a coil is provided in a magnetic body formed of a metal or ferrite sheet have been actively conducted.

Here, the coil in the coil type unit for wireless power transmission is a coil that electrically connects a plurality of coil patterns through a via-hole, but the thickness of the coil is increased and there are problems in terms of cost due to the plurality of coil patterns. Thus, recently, a coil (single-layered coil) in which a coil pattern is designed on the surface of a magnetic body in a loop shape has been widely used.

However, in case of the coil pattern designed in a loop shape, since the output wiring coil should pass over the wound coil wiring for electrical connection between an inner end (input terminal) and an outer end (output terminal) of the coil, the overall thickness of the coil becomes double.

Therefore, since the overall thickness of the coil is increased so that there are restrictions on slimming of a wireless power transmission device and an electronic device including the same and wiring forming and bonding processes for electrical connection are added, process costs are increased and manufacturing becomes inconvenient.

Therefore, in order to meet the current trend for thinner devices, there is a need for the development of a thinner coil type unit for wireless power transmission and a wireless power transmission device and an electronic device including the same.

RELATED ART DOCUMENT

Patent Document

Patent Document 1: Korean Patent Laid-Open Publication No. 2012-0008200

SUMMARY OF THE INVENTION

The present invention has been invented in order to overcome the above-described problems and it is, therefore, an object of the present invention to provide a coil type unit for wireless power transmission and a manufacturing method thereof, a wireless power transmission device, and an electronic device that can achieve slimming by minimizing the thickness of a coil.

Further, it is another object of the present invention to provide a coil type unit for wireless power transmission and a manufacturing method thereof, a wireless power transmission device, and an electronic device that can reduce process costs and facilitate manufacture thereof.

In accordance with one aspect of the present invention to achieve the object, there is provided a coil type unit for wireless power transmission, including: a coil portion having a coil pattern formed on a substrate; a magnetic portion having the coil portion attached to one surface thereof and a conductive pattern formed thereon; an adhesive portion interposed between the magnetic portion and the coil portion to bond the magnetic portion and the coil portion to each other; and a conductive hole for electrically connecting both ends of the coil pattern and the conductive pattern, wherein the adhesive portion is formed on one surface of the magnetic portion having the conductive pattern formed thereon while being formed in an area other than the area in which the conductive pattern is formed.

In an embodiment of the present invention, a wireless power transmission device may include a coil type unit for wireless power transmission in the present invention; and a circuit unit for wireless power transmission which is electrically connected to the coil type unit for wireless power transmission.

In an embodiment of the present invention, an electronic device may include a wireless power transmission device in the present invention; and a case for accommodating the wireless power transmission device therein.

And in accordance with another aspect of the present invention to achieve the object, there is provided a manufacturing method of a coil type unit for wireless power transmission, including: a conductive pattern formation step of forming a conductive pattern on a magnetic portion; an adhesive means formation step of forming an adhesive means on the magnetic portion having the conductive pattern formed thereon while forming the adhesive means in an area other than the area in which the conductive pattern is formed; a through-hole formation step of forming through-holes in the position of both ends of a coil pattern in a substrate having the coil pattern formed thereon; a bonding step of bonding the substrate having the through-holes formed therein to the magnetic portion through the adhesive means while disposing the through-holes in the position of the conductive pattern; and a through-hole filling step of electrically connecting the both ends of the coil pattern and the conductive pattern by filling a conductive material in the through-holes.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

A matter regarding to an operational effect including a technical configuration for an object of a coil type unit for wireless power transmission and a manufacturing method thereof, a wireless power transmission device, and an electronic device in accordance with the present invention will be clearly appreciated through the following detailed description with reference to the accompanying drawings showing preferable embodiments of the present invention.

Further, in describing the present invention, descriptions of well-known techniques are omitted so as not to unnecessarily obscure the embodiments of the present invention. In the present specification, the terms "first," "second," and the like are used for distinguishing one element from another, and the elements are not limited by the above terms.

<Coil Type Unit for Wireless Power Transmission Device>

Figure 1:
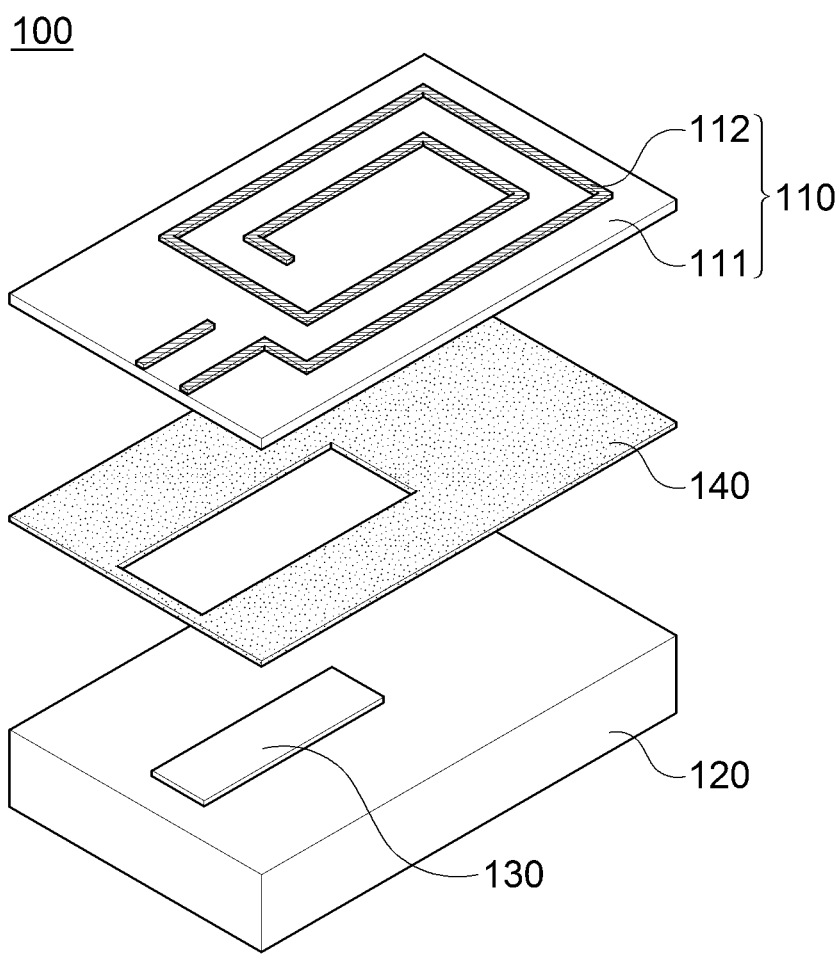
FIG. 1 is an exploded perspective view of a coil type unit for wireless power transmission in accordance with an embodiment of the present invention.

First, FIG. 1 is an exploded perspective view of a coil type unit 100 for wireless power transmission in accordance with an embodiment of the present invention. Further, FIG. 2 is a perspective view of the coil type unit 100 for wireless power transmission in accordance with an embodiment of the present invention and shows the coil type unit 100 for wireless power transmission including a conductive hole 150.

Figure 2:
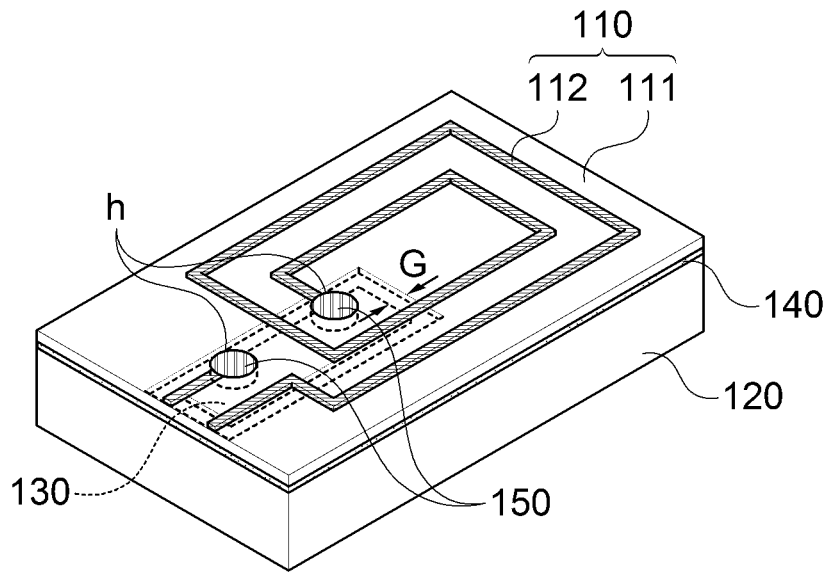
FIG. 2 is a perspective view of the coil type unit for wireless power transmission in accordance with an embodiment of the present invention.

As shown in FIGS. 1 and 2, the coil type unit 100 for wireless power transmission in accordance with the present embodiment may include a coil portion 110, a magnetic portion 120, a conductive pattern 130, an adhesive portion 140, and a conductive hole 150.

First, the coil portion 110 according to the present embodiment, as shown in FIGS. 1 and 2, has a coil pattern 112 formed on a substrate 111 and consists of the substrate 111 and the coil pattern 112.

At this time, the substrate 111, which is a thin film substrate having the coil pattern 112 formed thereon, may be a substrate such as a flexible printed circuit board (FPCB), but the present invention is not limited thereto and can use any substrate, which has a small thickness and can form a pattern thereon, such as a film type or thin printed circuit board.

Further, as shown in FIGS. 1 and 2, the present embodiment takes the case in which the coil pattern 112 having a single-layered pattern shape is formed in the shape of an overall rectangular vortex (loop), but the present invention is not limited thereto and allows various applications such as a circular or polygonal vortex shape as well as a multi-layered pattern shape.

Further, the magnetic portion 120 has the coil portion 110 fixedly attached to one surface thereof and is provided to efficiently form a magnetic path of a magnetic field generated by the coil pattern 112 of the coil portion 110. For this, the magnetic portion 120 is made of a material that can easily form a magnetic path. For example, the magnetic portion 120 may be formed by laminating and firing one or more magnetic casting sheets such as ferrite sheets.

However, the magnetic portion 120 according to the present embodiment does not limit the magnetic sheet only to the ferrite sheet and allows various applications such as use of at least one of a ferrite sheet, a metal sheet, and a hybrid type sheet that uses a combination of metal and ferrite as the magnetic sheet. At this time, the metal sheet may be made of Fe—Si—Al, Fe—Si—Cr, or Fe—Si—Al—Cr that can improve magnetic efficiency (permeability and Q-factor) or aluminum considering conductivity of a metal sheet layer but is not limited thereto.

Further, the conductive pattern 130 may be formed on the magnetic portion 120 as shown in FIGS. 1 and 2. As an example, the conductive pattern 130 may be simply formed on the magnetic portion 120 by a method of printing and laminating conductive ink or conductive paste. At this time, the conductive paste may be paste including silver powder, particularly paste including silver powder as a main material but is not limited thereto. In addition, the conductive pattern 130 may have adhesive properties and thus reinforce adhesive strength by contributing to the adhesion between the coil portion 110 and the magnetic portion 120 together with the adhesive portion 140 described below.

Further, the adhesive portion 140 is interposed between the coil portion 110 and the magnetic portion 120 to firmly bond the coil portion 110 and the magnetic portion 120 of the present embodiment to each other. At this time, as shown in FIGS. 1 and 2, the adhesive portion 140 is formed on one surface of the magnetic portion 120 having the conductive pattern 130 formed thereon while being formed in an area other than the area in which the conductive pattern 130 is formed.

Further, the adhesive portion 140 may be formed with the same thickness as the conductive pattern 130 to prevent the disturbance of the adhesion between the coil portion 110 and the magnetic portion 120 due to the different thicknesses of the conductive pattern 130 and the adhesive portion 140.

In addition, as shown in FIG. 2, the adhesive portion 140 may be formed on the magnetic portion 120 while maintaining a certain gap G with the conductive pattern 130 to prevent the electromagnetic interference between the different types of the conductive pattern 130 and the adhesive portion 140.

Meanwhile, the adhesive portion 140 as above may be formed of an adhesive film or an adhesive tape or may be formed by coating an adhesive or a resin having adhesive properties on the surface area of the magnetic portion 120 except the area in which the conductive pattern 130 is formed. But the adhesive portion 140 is not limited to the above configuration and allows various applications such as including ferrite powder to have magnetism with the magnetic portion 120.

Further, the conductive hole 150 according to the present embodiment electrically connects both ends of the coil pattern 112 of the coil portion 110 and the conductive pattern 130 on the magnetic portion 120.

Therefore, the conductive hole 150 of the present embodiment may be formed by forming a through-hole h in the position of the both ends of the coil pattern 112 of the coil portion 110, bonding the coil portion 110 and the magnetic portion 120 to each other while disposing the through-hole h in the position of the conductive pattern 130, and filling a conductive material in the through-hole h as shown in FIG. 2.

At this time, the through-hole h may be formed by a laser, CNC drilling, or punching process but are not limited thereto.

Further, the conductive hole 150 of the present embodiment may be formed by filling conductive ink or conductive paste as the conductive material in the through-hole h. For example, at this time, the conductive paste may be paste including silver powder, particularly paste including silver powder as a main material but is not limited thereto and the through-hole h may be filled by a known method such as plating, soldering, or dispensing.

<Manufacturing Method of Coil Type Unit for Wireless Power Transmission Device>

Figure 3:
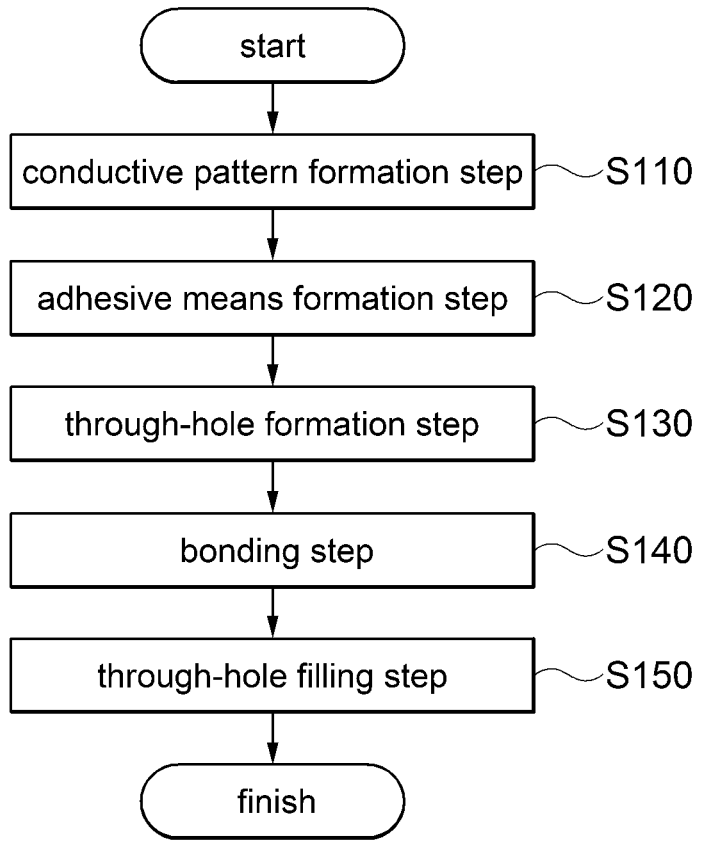
FIG. 3 is a flowchart for explaining a manufacturing method of a coil type unit for wireless power transmission in accordance with an embodiment of the present invention.

First, FIG. 3 is a flowchart for explaining a manufacturing method of a coil type unit for wireless power transmission in accordance with an embodiment of the present invention.

Referring to FIG. 3, the manufacturing method of a coil type unit for wireless power transmission in accordance with an embodiment of the present invention may include a conductive pattern formation step S110 of forming a conductive pattern on a magnetic portion, an adhesive means formation step S120 of forming an adhesive means on the magnetic portion having the conductive pattern formed thereon while forming the adhesive means in an area other than the area in which the conductive pattern is formed; a through-hole formation step S130 of forming through-holes in the position of both ends of a coil pattern in a substrate having the coil pattern formed thereon; a bonding step S140 of bonding the substrate having the through-holes formed therein to the magnetic portion through the adhesive means formed in the adhesive means formation step S120 while disposing the through-holes in the position of the conductive pattern; and a through-hole filling step S150 of electrically connecting the both ends of the coil pattern and the conductive pattern by filling a conductive material in the through-holes formed in the through-hole formation step S130.

FIGS. 4 to 8 are process diagrams showing the manufacturing method of a coil type unit for wireless power transmission in accordance with an embodiment of the present invention and each step of the above manufacturing method will be specifically described below with reference to the process diagram.

Figure 4:
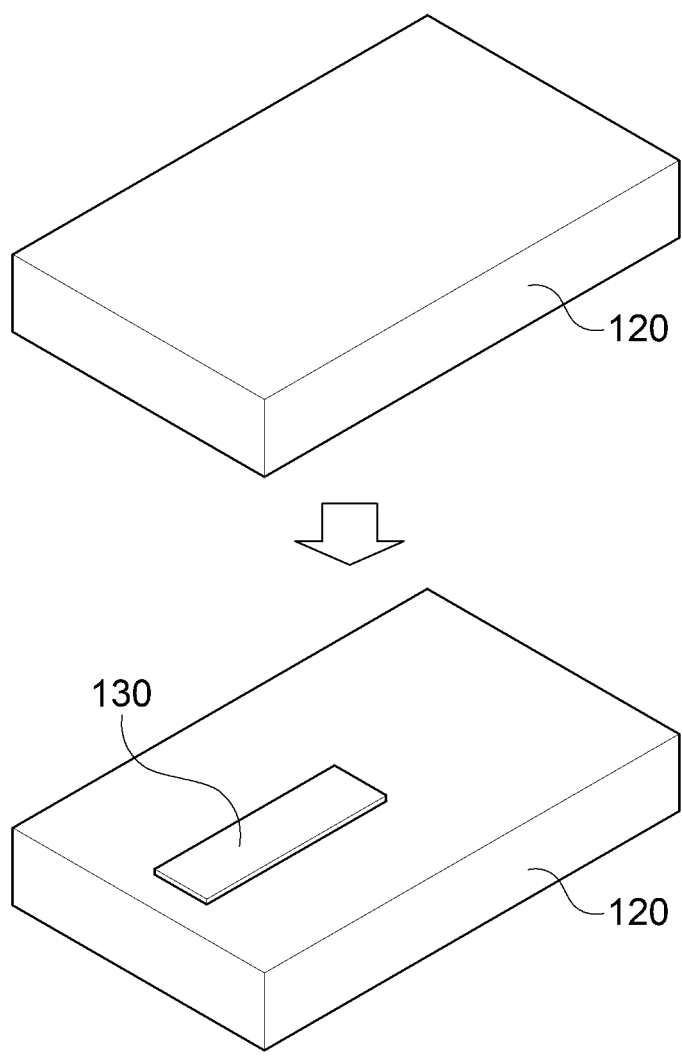
FIG. 4 is a process diagram showing a conductive pattern formation step of FIG. 3.

First, FIG. 4 is a process diagram showing the conductive pattern formation step S110 of FIG. 3.

As shown in FIG. 4, in the conductive pattern formation step S110 according to the present embodiment, a conductive pattern 130 may be formed on a magnetic portion 120. At this time, as an example, the conductive pattern 130 may be simply formed on the magnetic portion 120 by printing and laminating conductive ink or conductive paste. At this time, the conductive paste may be paste including silver powder, particularly paste including silver powder as a main material but is not limited thereto. Further, the conductive pattern 130 formed at this time may have adhesive properties and thus reinforce adhesive strength by contributing to the adhesion between a coil portion and the magnetic portion 120 together with an adhesive means described below.

Meanwhile, the magnetic portion 120 in the conductive pattern formation step S110 has the coil portion fixedly attached to one surface thereof and is provided to efficiently form a magnetic path of a magnetic field generated by a coil pattern of the coil portion. For this, the magnetic portion 120 is made of a material that can easily form a magnetic path. For example, the magnetic portion 120 may be formed by laminating and firing one or more magnetic casting sheets such as ferrite sheets.

However, the magnetic portion 120 in the conductive pattern formation step S110 does not limit the magnetic sheet only to the ferrite sheet and allows various applications such as use of at least one of a ferrite sheet, a metal sheet, and a hybrid type sheet that uses a combination of metal and ferrite as the magnetic sheet. At this time, the metal sheet may be made of Fe—Si—Al, Fe—Si—Cr, or Fe—Si—Al—Cr that can improve magnetic efficiency (permeability and Q-factor) or aluminum considering conductivity of a metal sheet layer but is not limited thereto.

Figure 5:
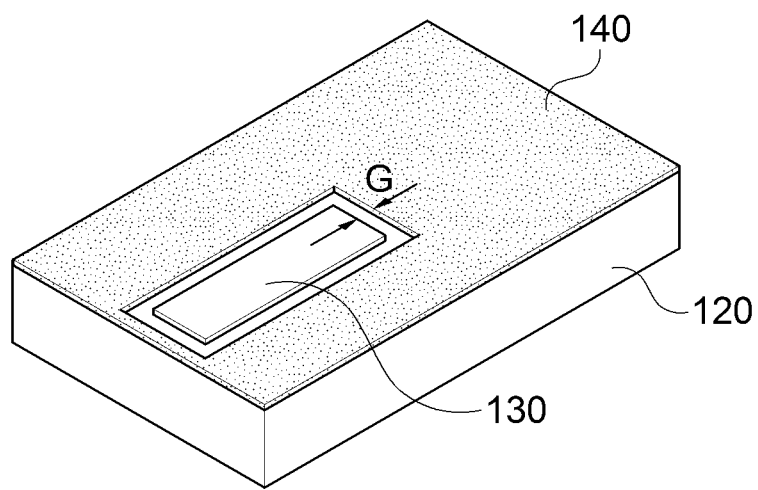
FIG. 5 is a process diagram showing an adhesive means formation step of FIG. 3.

Next, FIG. 5 is a process diagram showing the adhesive means formation step S120 of FIG. 3.

As shown in FIG. 5, in the adhesive means formation step S120 according to the present embodiment, an adhesive means 140 may be formed on the magnetic portion 120 having the conductive pattern 130 formed in FIG. 4. At this time, the adhesive means 140 is formed on one surface of the magnetic portion 120 having the conductive pattern 130 formed thereon, but is formed in an area other than the area in which the conductive pattern 130 is formed.

At this time, the adhesive means 140 may be formed with the same thickness as the conductive pattern 130 to prevent the adhesion between the coil portion 110 and the magnetic portion 120 due to the different thicknesses of the conductive pattern 130 and the adhesive portion 140 as described above.

Further, as shown in FIG. 5, the adhesive means 140 may be formed on the magnetic portion 120 while maintaining a certain gap G with the conductive pattern 130 to prevent the electromagnetic interference between the different types of the conductive pattern 130 and the adhesive portion 140 as described above.

In addition, the adhesive portion 140 may be formed of an adhesive film or an adhesive tape or may be formed by coating an adhesive or a resin having adhesive properties on the surface area of the magnetic portion 120 except the area in which the conductive pattern 130 is formed. But the adhesive portion 140 is not limited to the above configuration and allows various applications such as including ferrite powder to have magnetism with the magnetic portion 120.

Figure 6:
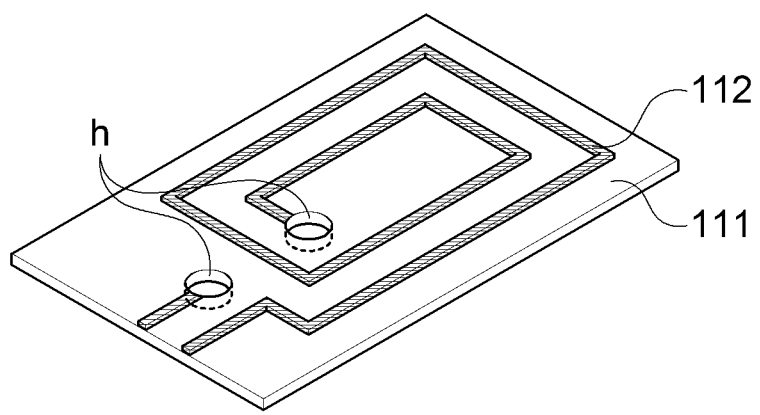
FIG. 6 is a process diagram showing a through-hole formation step of FIG. 3

Next, FIG. 6 is a process diagram showing the through-hole formation step S130 of FIG. 3.

As shown in FIG. 6, in the through-hole formation step S130 according to the present embodiment, through-holes h may be formed in the position of the both ends of the coil pattern 112 in a substrate 111 having the coil pattern 112 formed thereon. At this time, the through-holes h may be formed by a laser, CNC drilling, or punching process but are not limited thereto.

Figure 7:
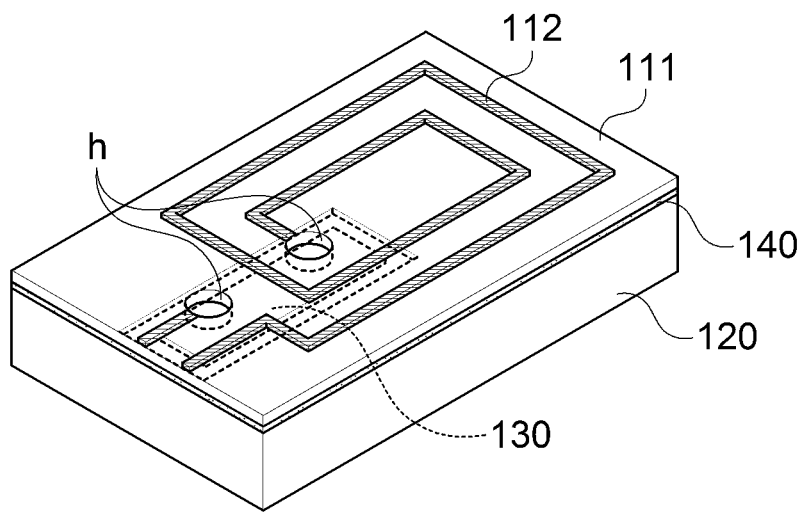
FIG. 7 is a process diagram showing a bonding step of FIG. 3.

Next, FIG. 7 is a process diagram showing the bonding step S140 of FIG. 3.

As shown in FIG. 7, in the bonding step S140 according to the present embodiment, the substrate 111 having the through-holes 111 formed in FIG. 6 is bonded to the magnetic portion 120 having the conductive pattern 130 formed thereon through the adhesive means 140 formed in FIG. 5. At this time, the substrate 111 may be bonded so that the through-holes h are disposed in the position of the conductive pattern 130 of the magnetic portion 120.

At this time, the substrate 111, which is a thin film substrate having the coil pattern 112 formed thereon, may be a substrate such as a flexible printed circuit board (FPCB), but the present invention is not limited thereto and can use any substrate, which has a small thickness and can form a pattern thereon, such as a film type or thin printed circuit board.

Further, as shown in FIG. 7, the present embodiment takes the case in which the coil pattern 112 having a single-layered pattern shape is formed in the shape of an overall rectangular vortex (loop), but the present invention is not limited thereto and allows various applications such as a circular or polygonal vortex shape as well as a multi-layered pattern shape.

Figure 8:
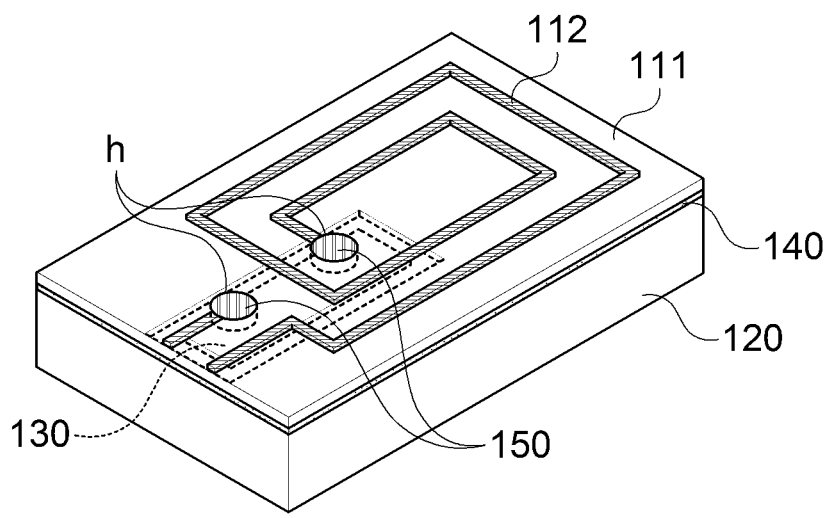
FIG. 8 is a process diagram showing a through-hole filling step of FIG. 3.

Next, FIG. 8 is a process diagram showing the through-hole filling step S150 of FIG. 3.

As shown in FIG. 8, in the through-hole filling step S150 according to the present embodiment, conductive holes 150 may be formed to electrically connect the both ends of the coil pattern 112 and the conductive pattern 130 by filling a conductive material in the through-holes h formed in FIG. 6.

Further, in the through-hole filling step S150 according to the present embodiment, the conductive material filled in the through-holes h may be conductive ink or conductive paste. For example, at this time, the conductive paste may be paste including silver powder, particularly paste including silver powder as a main material but is not limited thereto and the through-hole h may be filled by a known method such as plating, soldering, or dispensing.

<Wireless Power Transmission Device and Electronic Device>

Figure 9:
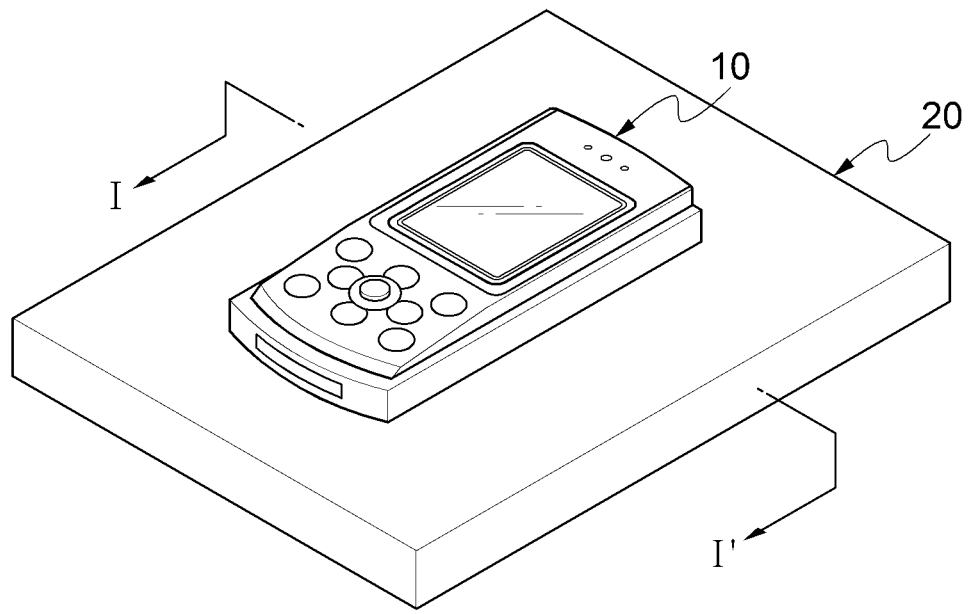
FIG. 9 is a perspective view schematically showing an electronic device and a charging device in accordance with an embodiment of the present invention.
Figure 10:
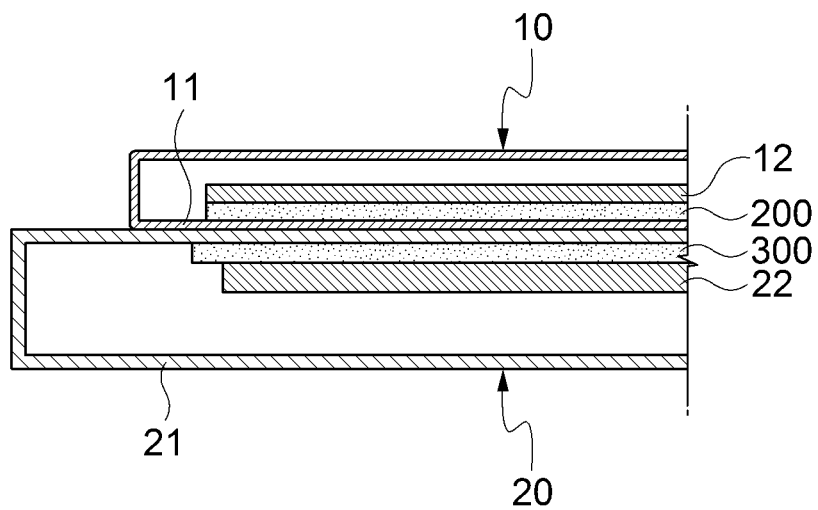
FIG. 10 is a cross-sectional view taken along line I-I' of FIG. 9.

FIG. 9 is a perspective view schematically showing an electronic device 10 and a charging device 20 in accordance with an embodiment of the present invention, and FIG. 10 is a cross-sectional view taken along line I-I' of FIG. 9.

Referring to FIGS. 9 and 10, the electronic device 10 according to the present embodiment may include a battery 12, a wireless power reception device 200, and cases 11 and 21.

First, the battery 12, which stores power generated from the wireless power reception device 200, may be a rechargeable secondary battery and configured to be detachable from the electronic device 10.

Further, the wireless power reception device 200, which supplies power to the battery 12 to charge the battery 12, may be accommodated in the case 11 of the electronic device 10 to be directly attached to the inner surface of the case 11 or disposed as close as possible to the inner surface of the case 11.

Further, the charging device 20 according to the present embodiment is provided to charge the battery 12 of the electronic device 10. For this, the charging device 20 may have a wireless power transmission device 300 inside the case 21 thereof.

The cases 11 and 21, which accommodate the wireless power transmission device therein, may be an external case frame of the electronic device 10 or a case frame of the battery 12.

Further, the charging device 20 converts household AC power supplied from the outside into DC power and converts the DC power into an AC voltage of specific frequency again to provide the AC voltage to the wireless power transmission device 300. For this, the charging device 20 may have a voltage converter 22 for converting household AC power into an AC voltage of specific frequency.

When the above AC voltage is applied to a coil of the wireless power transmission device 300, a magnetic field around the coil is changed. Therefore, a voltage is applied to the wireless power reception device 200 of the electronic device 10 adjacent to the wireless power transmission device 300 according to a change in the magnetic field and thus the battery 12 is charged.

Hereinafter, the wireless power reception device 200 provided in the electronic device 10 will be described.

Figure 11:
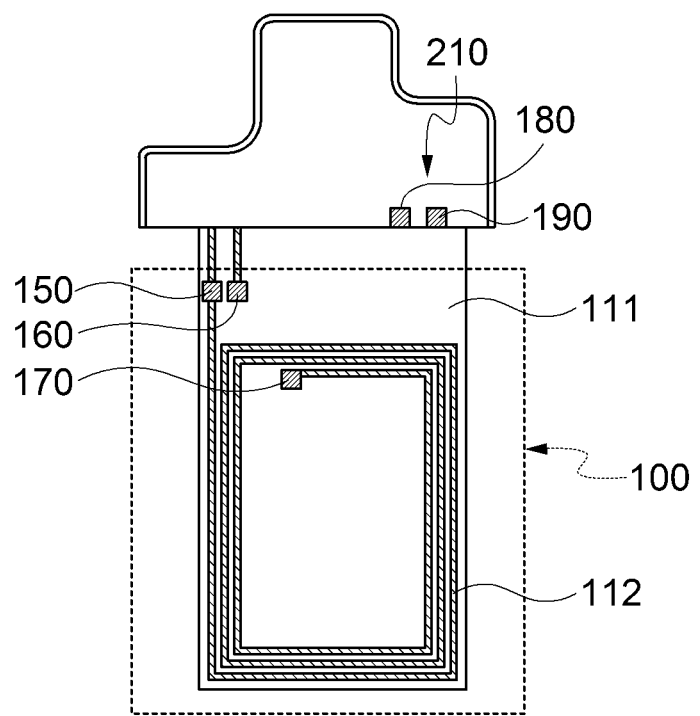
FIG. 11 is a perspective view of a wireless power reception device in accordance with an embodiment of the present invention.

FIG. 11 is a perspective view of the wireless power reception device 200 in accordance with an embodiment of the present invention. As shown in FIG. 11, the wireless power reception device 200 according to the present embodiment may include a coil type unit 100 for wireless power transmission in accordance with the above-described embodiment of the present invention and a circuit unit 210 for wireless power transmission.

At this time, the coil type unit 100 and the circuit unit 210 according to the present embodiment are electrically connected to each other. For example, as shown in FIG. 11, the coil type unit 100 and the circuit unit 210 may be electrically connected by a first contact pad 150 and a second contact pad 160.

Although not limited thereto, when both ends of a coil pattern 112 consist of an inner end and an outer end like the coil type unit 100 of the present embodiment, the coil type unit 100 and the circuit unit 210 of the present embodiment may be electrically connected by connecting a third contact pad 170 formed on the inner end to the second contact pad 160 of the outer end through a conductive pattern, which is formed on a magnetic portion to be embedded in a coil portion substrate 111, and a conductive hole.

Meanwhile, first and second external connection pads 180 and 190 may be formed in the circuit unit 210 for wireless power transmission of the present embodiment.

Therefore, power received through the coil type unit 100 of the present embodiment can be connected to a battery (not shown) through the first and second external connection pads 180 and 190 after being processed through the circuit unit 210 of the present embodiment.

The first and second external connection pads 180 and 190 and the first to third connection pads 150, 160, and 170 of the present embodiment may be connected in various ways. For example, the first and second external connection pads 180 and 190 may be electrically connected by a separate wire. Further, the first to third contact pads 150, 160, and 170 may electrically connect the coil type unit 100 and the circuit unit 210 using a wiring pattern embedded or formed in the coil portion substrate 111 of the coil type unit 100.

Further, the wireless power reception device 200 of the present embodiment configured as above can be attached to a structure inside a mobile phone case etc. by a simple method such as an adhesive or a double-sided tape, thus reducing manufacturing costs and process costs.

Meanwhile, the configuration of the wireless power reception device 200 described above can be equally applied to the wireless power transmission device 300 provided in the charging device 20. Therefore, detailed descriptions of the wireless power transmission device 300 will be omitted.

Figure 12A:
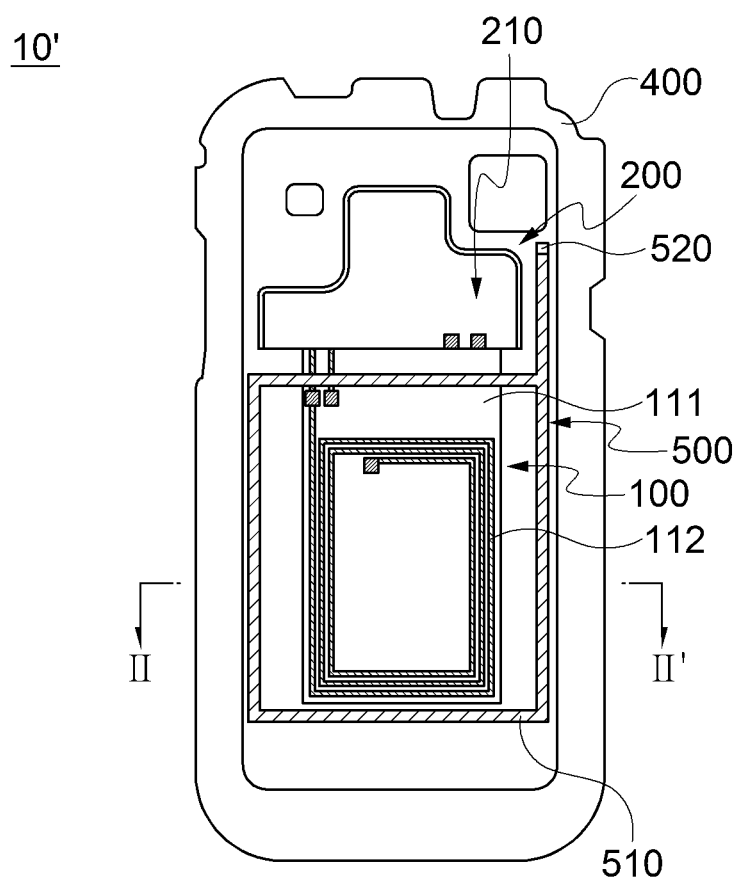
FIG. 12A and FIG. 12B are views schematically showing an electronic device including a wireless power reception device and an antenna module in accordance with an embodiment of the present invention.
Figure 12B:
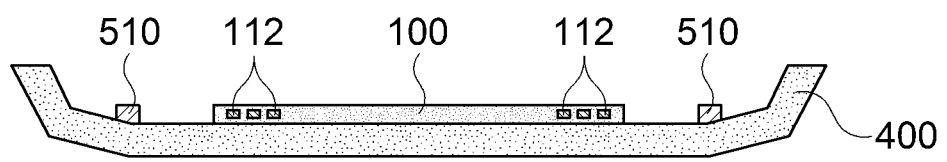

FIG. 12A and FIG. 12B show an electronic device 10' including a wireless power reception device 200 and an antenna module 500 in accordance with an embodiment of the present invention.

The electronic device 10' according to the present embodiment includes a wireless power reception device 200 according to the present embodiment and a case 400 for accommodating the wireless power reception device 200 inside thereof.

As described above, since the wireless power reception device 200 according to the present embodiment is implemented with a coil type unit 100 in which both ends of a coil pattern 112 are electrically connected through a conductive pattern, which is formed on a magnetic portion to be embedded in a coil portion substrate 111, and a conductive hole, it can be slimmed. Further, the wireless power reception device 200 according to the present embodiment can be simply attached inside the case 400 by means such as a double-sided tape and an adhesive.

Further, the electronic device 10' according to the present embodiment may have interference between the wireless power reception device 200 and an antenna according to the frequency used when the wireless power reception device 200 and the various antennas are accommodated together.

Particularly, in case of wireless power transmission, power transmission may be performed in the low frequency band of 1 kHz to 10 MHz. In this case, the interference between the wireless power reception device 200 and the antenna may occur according to the position thereof when the frequency used is low like a low frequency band antenna.

Further, there are many restrictions on space layout inside the electronic device 10' according to the miniaturization of the electronic device 10'. In addition, there are also restrictions on layout of the wireless power transmission device and the low frequency antenna in order to prevent the interference between the wireless power transmission device and the low frequency antenna.

Referring to FIGS. 12*a* and 12*b*, the electronic device 10' according to the present embodiment may include the wireless power reception device 200 and the antenna module 500.

First, the wireless power reception device 200, as described above, may include a coil type unit 100 for wireless power transmission and a circuit unit 210 according to the present embodiment.

Further, the antenna module 500 may include an antenna pattern 510 formed to surround a coil pattern 112 in the wireless power reception device 200.

At this time, the antenna module 500 of the present embodiment may include the antenna pattern 510 and one or more connection terminals 520 connected to the antenna pattern 510 and a circuit board corresponding to the antenna pattern 510.

As shown in FIG. 12B showing a cross-section taken along line of II-II' FIG. 12A, the antenna pattern 510 of the antenna module 500 may be formed to surround the coil pattern 112 of the coil type unit 100 of the wireless power reception device 200, thus preventing the interference between the antenna pattern 510 and the coil pattern 112.

Further, the antenna module 500 of the present embodiment may be at least one selected from the group consisting of a near field communication (NFC) antenna, a radio frequency identification (RFID) antenna, a frequency modulation (FM) antenna, a digital multimedia broadcasting (DMB) antenna, and a wireless charging NFC antenna but can use various types of antennas without being necessarily limited to the above antennas.

Since the coil pattern in the wireless power transmission device of the present embodiment uses a frequency of 1 kHz to 10 MHz, the layout of the coil pattern and the antenna pattern according to the present embodiment can improve frequency reception efficiency and accuracy when applied to an NFC antenna and an RFID antenna using a frequency of 10 kHz to 100 MHz.

It is possible to implement a low frequency antenna such as an NFC or RFID antenna using 13.56 MHz with the wireless power transmission device (wireless power reception device) even when using 125 kHz band as a wireless power transmission frequency by forming the antenna pattern to surround the coil pattern as above.

The antenna module 500 of the present embodiment may be disposed above or below the wireless power reception device 200 or may be mounted to be attached to the case 400 with the wireless power reception device 200.

The electronic device 10' described above can be equally applied to the configuration in which the antenna module 500 is applied to a wireless power transmission device 300. Thus, detailed descriptions of the electronic device in which the antenna module 500 is applied to the wireless power transmission device 300 will be omitted.

The coil type unit for wireless power transmission and the manufacturing method thereof in accordance with the present embodiment described above can electrically connect the both ends (inner end and outer end) of the coil pattern through the conductive pattern and the conductive hole by including the conductive pattern which is formed on the magnetic portion to be embedded in the coil portion substrate.

Therefore, according to the coil type unit for wireless power transmission and the manufacturing method thereof in accordance with the present embodiment, since it is not needed to pass the output wiring coil over the wound coil wiring for the electrical connection between the inner end and the outer end of the coil, it is possible to prevent the overall increase in the thickness of the coil due to the electrical connection between the both ends of the coil.

Therefore, according to the coil type unit for wireless power transmission and the manufacturing method thereof in accordance with the present embodiment, it is possible to achieve slimming by minimizing the thickness of the coil and it is also possible to achieve slimming of the wireless power transmission device and the electronic device including the coil type unit of the present embodiment.

Further, according to the coil type unit for wireless power transmission and the manufacturing method thereof in accordance with the present embodiment, as described above, since it is not needed to pass the output wiring coil over the wound coil wiring for the electrical connection between the inner end and the outer end of the coil, additional processes of forming additional wiring or performing bonding for the electrical connection between the both ends of the coil are not needed, thus reducing process costs and facilitating manufacture thereof.

As described above, the coil type unit for wireless power transmission and the manufacturing method thereof, the wireless power transmission device, and the electronic device according to the present invention can minimize the thickness of the coil by electrically connecting the both ends of the coil pattern using the conductive pattern which is formed on the magnetic portion to be embedded in the coil portion substrate, thereby achieving slimming of the wireless power transmission device and the electronic device including the coil type unit for wireless power transmission as well as the coil type unit for wireless power transmission.

Further, the coil type unit for wireless power transmission and the manufacturing method thereof, the wireless power transmission device, and the electronic device according to the present invention have no need for additional processes such as additional wiring forming and bonding for electrical connection by electrically connecting the both ends of the coil pattern using the conductive pattern which is formed on the magnetic portion to be embedded in the coil portion substrate, thus reducing process costs and facilitating manufacture thereof.

Reference in the specification to "an embodiment" of the present principles, as well as other variations thereof, means that a particular feature, structure, characteristic, and so forth described in connection with the embodiment is included in at least one embodiment of the present principles. Thus, the appearances of the phrase "in an embodiment", as well as any other variations, appearing in various places throughout the specification are not necessarily all referring to the same embodiment.

While operations are depicted in the drawings of the present invention, this should not be understood as requiring that such operations be performed in the particular order shown or that all illustrated operations be performed to achieve desirable results. In certain circumstances, multitasking and parallel processing may be advantageous.

In the specification, "at least one of" in the case of "at least one of A and B" is intended to encompass the selection of the first listed option (A) only, or the selection of the second listed option (B) only, or the selection of both options (A and B). As a further example, the case of "at least one of A, B, and C" is intended to encompass the selection of the first listed option (A) only, or the selection of the second listed option (B) only, or the selection of the third listed option (C) only, or the selection of the first and second listed options (A and B) only, or the selection of the second and third listed options (B and C) only, or the selection of all three options (A, B, and C). This can be extended, as readily apparent by those skilled in the related arts, for as many items listed.

So far the preferable embodiments of the present invention have been described. All the embodiments and conditional examples disclosed through the specification are intended to help those skilled in the art to understand the principles and concepts of the present invention, and it will be appreciated by those skilled in the art that the present invention can be implemented in a modified form without departing from the essential characteristics of the present invention. Therefore, the embodiments should be considered in descriptive sense and not for purpose of limitation. The scope of the present invention is defined by the appended claims rather than the foregoing description, and all differences within the scope will be construed as being included in the present invention.

What is claimed is:

1. A coil type unit for wireless power transmission, comprising:
   a coil portion having a coil pattern formed on a substrate;
   a magnetic portion having a conductive pattern;
   an adhesive portion interposed between the magnetic portion and the coil portion to bond the magnetic portion and the coil portion to each other; and
   a conductive hole formed in the substrate for electrically connecting both ends of the coil pattern and the conductive pattern,
   wherein the adhesive portion is formed on one surface of the magnetic portion having the conductive pattern formed thereon while being formed in an area other than the area in which the conductive pattern is formed, and
   wherein the adhesive portion is formed to have the same thickness as the conductive pattern.

2. The coil type unit for wireless power transmission according to claim 1, wherein the conductive pattern is formed using conductive ink or conductive paste.

3. The coil type unit for wireless power transmission according to claim 1, wherein the adhesive portion maintains a certain gap with respect to the conductive pattern.

4. The coil type unit for wireless power transmission according to claim 1, wherein the magnetic portion is formed by performing sintering after laminating one or more magnetic sheets.

5. The coil type unit for wireless power transmission according to claim 4, wherein the magnetic sheet is at least one of a ferrite sheet, a metal sheet, and a hybrid type sheet which uses a combination of metal and ferrite.

6. The coil type unit for wireless power transmission according to claim 1, wherein the adhesive portion is formed of an adhesive film or an adhesive tape.

7. The coil type unit for wireless power transmission according to claim 1, wherein the adhesive portion is formed by coating an adhesive or a resin having adhesive properties.

8. The coil type unit for wireless power transmission according to claim 1, wherein the conductive hole is formed by forming through-holes in the position of the both ends of the coil pattern, bonding the magnetic portion and the coil portion to each other while disposing the through-holes in the position of the conductive pattern, and filling conductive ink or conductive paste in the through-holes.

9. The coil type unit for wireless power transmission according to claim 1, wherein the substrate is a flexible printed circuit board (FPCB), and the coil pattern has a single-layered pattern shape.

* * * * *